(12) United States Patent
Neal et al.

(10) Patent No.: US 7,232,178 B2
(45) Date of Patent: Jun. 19, 2007

(54) VEHICLE HOOD ASSEMBLY AND METHOD OF ELEVATING VEHICLE HOOD

(75) Inventors: Mark O. Neal, Rochester, MI (US); Joseph D. Mc Cleary, Clinton Township, Macomb County, MI (US); Kenneth J. Baron, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/055,468

(22) Filed: Feb. 10, 2005

(65) Prior Publication Data

US 2006/0175844 A1 Aug. 10, 2006

(51) Int. Cl.
*B60R 27/00* (2006.01)
*B60N 3/00* (2006.01)

(52) U.S. Cl. .................. 296/187.04; 296/193.11; 180/274; 292/DIG. 14; 292/DIG. 65

(58) Field of Classification Search .............. 292/95, 292/DIG. 14, 336.3, DIG. 65; 296/187.04 X, 296/187.09, 193.11 X; 180/274 X; 49/381, 49/280
See application file for complete search history.

(56) References Cited

U.S. PATENT DOCUMENTS 5,048,877 A 9/1991 Rogers, Jr. et al.
5,197,560 A * 3/1993 Oda et al. ............. 180/69.21
5,833,024 A * 11/1998 Kaneko ................. 180/69.2
6,293,362 B1 * 9/2001 Sasaki et al. ........... 180/274
6,332,115 B1 * 12/2001 Nobusawa et al. ....... 702/142
6,345,679 B1 * 2/2002 Sasaki .................... 180/274
6,364,402 B1 * 4/2002 Sasaki ................. 296/187.09
6,415,882 B1 7/2002 Schuster et al.
6,439,330 B1 * 8/2002 Paye .................... 180/69.21
6,513,617 B2 * 2/2003 Sasaki et al. ........... 180/274
6,520,276 B2 * 2/2003 Sasaki et al. ........... 180/274
6,571,901 B2 * 6/2003 Lee ....................... 180/274
6,588,526 B1 * 7/2003 Polz et al. ............. 180/69.21
6,600,412 B2 * 7/2003 Ishizaki et al. .......... 340/436
6,953,220 B2 * 10/2005 Takehara ............. 296/187.04

* cited by examiner

*Primary Examiner*—Brian E. Glessner
*Assistant Examiner*—Mark Williams
(74) *Attorney, Agent, or Firm*—Kathryn A. Marra

(57) ABSTRACT

This invention relates to a vehicle hood assembly that is operative to raise the rearward and frontward portions of a vehicle hood. The system includes an actuator selectively extendable to raise the rearward portion of a vehicle hood from a first position to a higher second position. A striker of novel design enables the frontward portion of the hood to rise as the rearward portion rises when the striker is engaged with a latch member. The latch member may be disengaged from the striker without extending the actuator, enabling the hood to reach a third position ideal for vehicle service and thus allowing a nonreversible-type actuator to be employed. A method of elevating the vehicle hood with respect to the vehicle body is also provided.

16 Claims, 2 Drawing Sheets

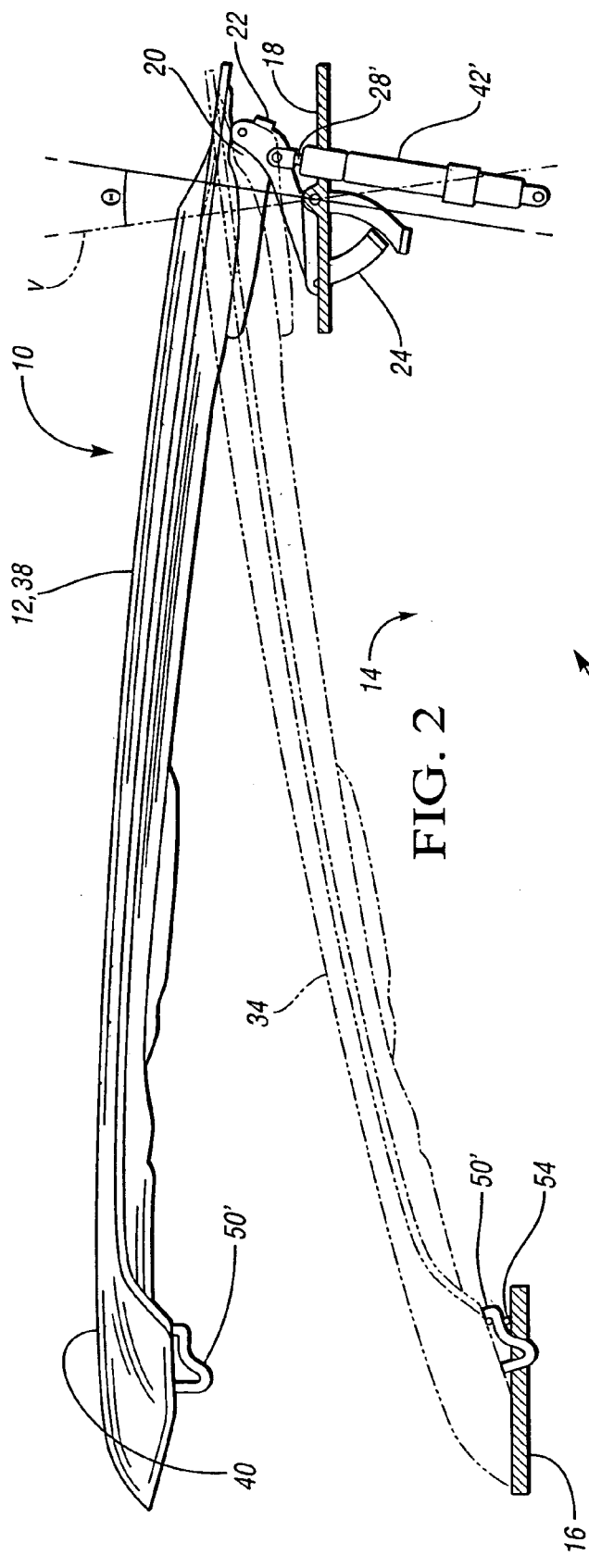
FIG. 2
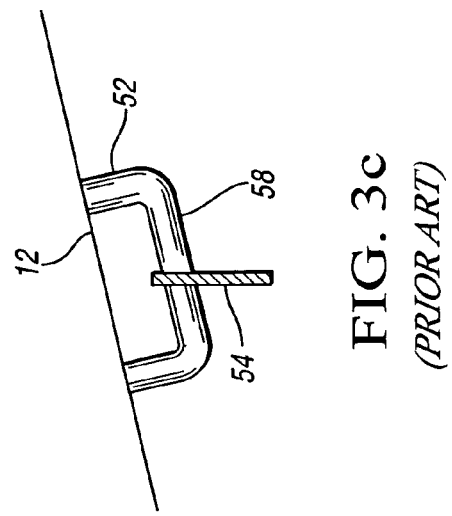
FIG. 3a
FIG. 3b
FIG. 3c (PRIOR ART)

VEHICLE HOOD ASSEMBLY AND METHOD OF ELEVATING VEHICLE HOOD

TECHNICAL FIELD

This invention relates to a vehicle hood assembly able to elevate the frontward portion of a vehicle hood.

BACKGROUND OF THE INVENTION

Typically, vehicle hoods are deformable when a downward force is exerted on the hood such as in a vehicle impact situation. However, the deformability of the hood can be influenced by the proximity of the hood to the rigid components in the vehicle's front (or engine) compartment. The hood's ability to absorb energy through deformation can be significantly impeded where the hood and engine compartment are in close proximity. In contrast, clearance between a vehicle hood and its engine compartment can increase the hood's ability to absorb energy when the hood is acted upon with a downward force. Therefore, notwithstanding other design concerns such as aerodynamics, it can be advantageous to increase the clearance between a vehicle hood and vehicle compartment in the frontward and rearward areas of the vehicle hood.

Also, since vehicle hoods cover engine components, they are typically configured to allow reasonable access to the front compartment of the vehicle for servicing of the engine compartments.

SUMMARY OF THE INVENTION

The invention provides a novel hood latch assembly including a latch member and a striker configured to cooperate to allow a frontward portion of a vehicle hood to be elevated when the actuator elevates a rearward portion of the hood, the latch member remaining engaged with the striker as the hood rises. This allows the hood to act as an energy-absorbing device upon an impact with the hood, including an impact with the frontward portion.

A vehicle hood assembly includes a hood configured to extend above and over a vehicle compartment. The vehicle compartment is defined at least partially by a vehicle body. A support member is connected between the hood and the vehicle body and is movable to raise the hood from a first to a second higher (or raised) position. The support member is connected to an actuator that extends to move the support member and resultantly influence the position of the vehicle hood. A striker is operatively connected to either the hood or the vehicle body, preferably at an opposing end of the hood from the support member. The striker is configured to define a predetermined course with respect to which the hood moves from the first position to the second position. A latch member, which is connected to either the hood or vehicle body, selectively engages and disengages with the striker.

The hood assembly is moveable to a third position that is suitable for vehicle service. The latch member may be disengaged from the striker to permit movement of the hood from the first position to the third position. Importantly, this disengagement may occur without operating the actuator. Thus, because the actuator need not be used to allow the hood to open for normal vehicle servicing, a non-reversible actuator may be employed. This represents a potential cost savings over hood assemblies requiring reversible actuators in order to permit access to the front compartment for servicing.

The hood assembly may have a sensing system that activates the actuator. In one aspect of the invention, the actuator is activated upon impact with either the hood or the vehicle body. However, in another aspect of the invention the actuator is activated upon a determination that the possibility of impact with the hood or the vehicle body is greater than a predetermined amount.

The actuator can direct the travel of the hood. In another aspect of the invention, the actuator exerts a forward force on the hood, thereby causing the hood to move such that it is at least partially more forward with respect to the vehicle compartment in the second position than in the first position. However, in another aspect of the invention, the actuator exerts a rearward force on the hood, thereby causing the hood to move such that is at least partially more rearward with respect to the vehicle compartment in the second position than in the first position. Moreover, in another aspect of the invention, the actuator exerts a force on the hood in a direction cooperative with the predetermined course defined by the striker.

In another aspect of the invention, the striker is cooperatively configured with the support member such that the second position is frontward the first position. However, in another aspect of the invention, the striker is cooperatively configured with the support member such that the second position is rearward of the first position.

Elevation of the vehicle hood is preferably automated. Accordingly, a method for elevating a vehicle hood with respect to a vehicle body is also provided. The method includes providing a striker connected to either the hood or vehicle body and operative to automatically guide the frontward end of the vehicle hood with respect to a predetermined course to thereby raise the frontward end. The method further includes providing a latch member connected to the other of the hood or the vehicle body and engaged with the striker to latch the hood to the vehicle body. The method further includes providing an actuator extendable to elevate the rearward end of the vehicle hood upon an impact with either the hood or the body, or upon the determination that a possibility of such impact is greater than a predetermined amount. The striker automatically guides the frontward end of the hood in response to the actuator elevating the rearward end of the hood. The method further includes disengaging the latch member from the striker without operating the actuator and raising the frontward end of the hood to permit access to the front compartment without extending the actuator.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a partially cross-sectional schematic elevational view of the hood assembly of FIG. 1a with the hood in a third position and with the hood (in phantom) in the first position;

FIG. 3a is a side view of a striker designed to enable the hood to travel frontward of the vehicle compartment, the striker engaged with a latch shown in fragmentary, cross-sectional view;

FIG. 3b is a cross-sectional side view of a striker designed to enable the hood to travel rearward of the vehicle compartment, the striker engaged with a latch shown in fragmentary, cross-sectional view; and FIG. 3c is a cross-sectional side view of a prior art striker and latch design.

DESCRIPTION OF THE PREFERRED EMBODIMENTS

Figures 1A, 1B:
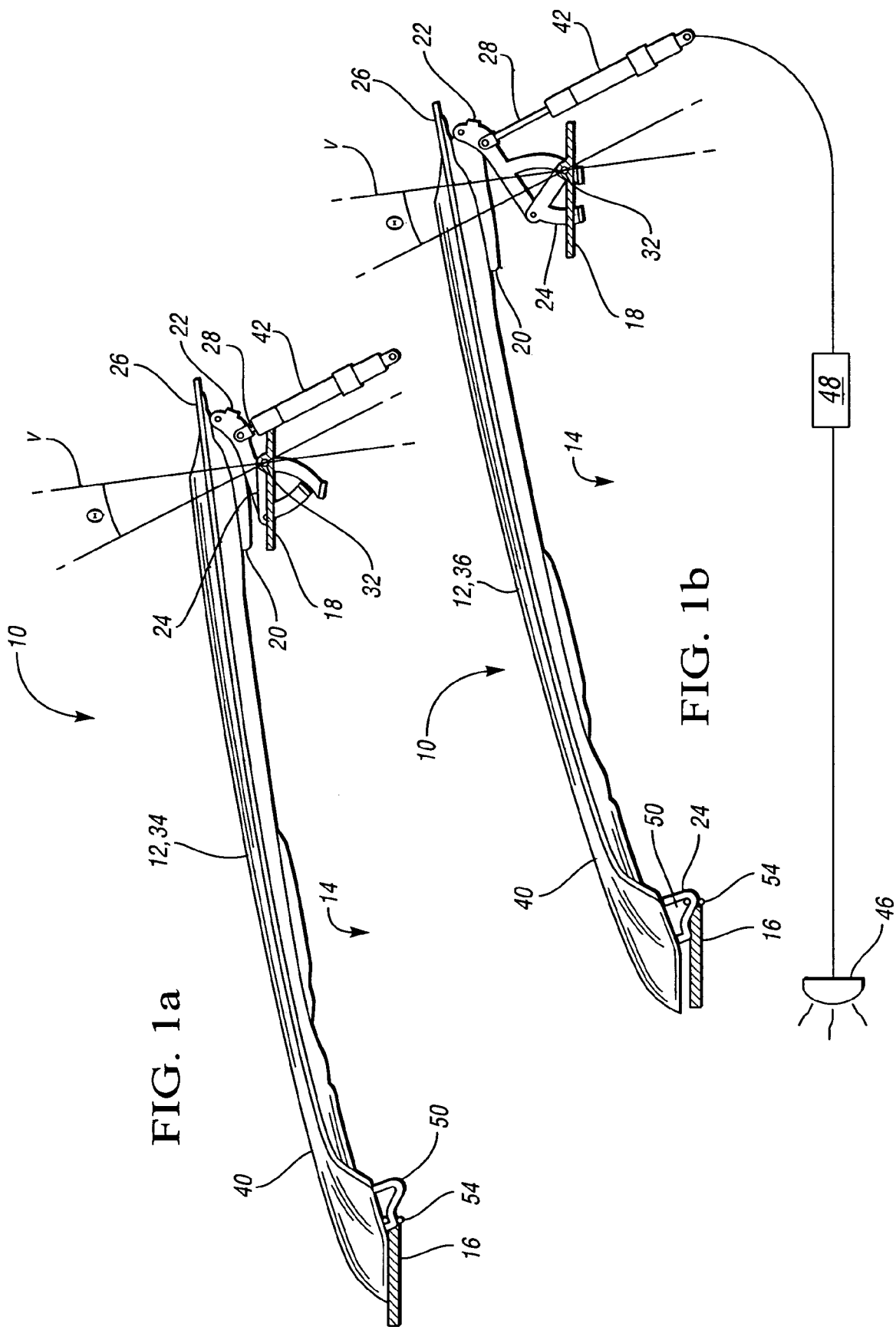
FIG. 1a is a partially cross-sectional schematic elevational view of a vehicle hood assembly with a hood in a first position.
FIG. 1b is a partially cross-sectional schematic elevational view of the hood assembly of FIG. 1a with the hood moved to a second position.

Referring now to the drawings, FIGS. 1a–3c, wherein like reference numbers refer to like components, FIG. 1a shows a vehicle hood assembly 10. The hood assembly 10 includes a hood 12 configured to extend above and over a front compartment 14 defined by a vehicle body structure (as partially shown at 16 and 18). The hood 12 is configured to pivot about a support member (20, 22, 24). Only one support member is visible in FIG. 1a. Preferably, another support member is transversely spaced from the support member shown near the rearward end 26 of the hood 12.

The support member (20, 22, 24) consists of three links. The first link 20 is mounted underneath the rearward end 26 of the vehicle hood 12 and is pivotably connected with a second link 22. The second link 22 has three arms, the first of which is pivotably connected with the first link 20 and attached to the actuator rod 28. The second link 22 is also pivotably connected to the third link 24 at another arm and pivotably connected with a bracket member 32, which is mounted to the vehicle body at 18, at the last arm. The third link 24 is mounted to the vehicle body at 18 and pivotably connected to the second link 22 at two separate points. The support member (20, 22, 24) is connected to the vehicle body structure at 18 and facilitates hood movement between a first position 34 (shown in FIG. 1a); second position 36 (shown in FIG. 1b); and third position 38 (as shown in FIG. 2). In the first position 34 of FIG. 1a, the frontward portion 40 and a rearward portion 26 of the hood 12 are in a relatively lowered position with respect to the vehicle body structure defined at 16 and 18. In the second position 36 of FIG. 1b, the frontward portion 40 is raised a distance H from the vehicle body structure at 16. (Quantification of the distance H is discussed further with respect to FIGS. 3a and 3b.) The rearward portion 26 of the hood 12 is also raised from the vehicle body structure at 18 when the hood 12 is in the second position 36. The support member (20, 22, 24) is pivotably connected to support elevation in multiple directions: between the first position 34 and second position 36 as well as between the first position 34 and third position 38. Persons of ordinary skill in the art will know that the support member (20, 22, 24) presented in the preferred embodiment of this application is not the only way to accomplish hinging the vehicle hood 12 with respect to the vehicle body structure (16, 18).

Attached to the second link 22 of the support member and mounted to the vehicle body structure at 18 is an actuator 42. Only one actuator 42 and support member 20, 22, 24 is shown in FIGS. 1a–1b. Preferably, another duplicate actuator 42 and support member 20, 22, 24 is spaced along the rearward end 26 for additional support of the hood 12. Though the preferred embodiment utilizes two actuators 42 transversely spaced with respect to each other, within the scope of the invention, the hood assembly may be operable with only one actuator as well. The actuator 42 extends to selectively move the rearward end 26 of the hood 12 from the first position 34 to the second position 36.

In a preferred embodiment, the actuator 42 is a non-reversible pneumatic rotary actuator utilizing pressurized air to rotate its mechanical components (not shown) and extend the actuator rod 28. As the pressurized air flows the moving components (such as a rack and pinion system or cam) rotate. These mechanical components are linked to the actuator rod 28 causing it to extend as the pressurized air is released. In another embodiment, the actuator is reversible. This type of actuator consists of a small electric motor (not shown), which turns a group of spur gears (not shown) to produce a gear reduction. The final gear drives a rack-and-pinion gear set (not shown) which is connected to the actuator rod 28. The rack-and-pinion gear set converts the rotational motion of the motor into the linear motion needed to move the actuator rod 28 and resultantly elevate the rearward portion 26 of the vehicle hood 12 at the first link 20 of the support member. The actuator rod 28 moves the second link 22 of the set of support members which then elevates the first link 20 thereby driving the rearward portion 26 of the hood 12 in the desired direction, as the first link 20 is mounted to the hood 12. With a non-reversible actuator 42, as in the preferred and potentially less expensive embodiment, the hood 12 is not moveable from the second position 36 to the first position 34 via the actuator 42. Reversible actuators, however, are both extendable and retractable and therefore can selectively move the hood 12 from the second position 36 to the first position 34 and vice versa. Those skilled in the art will readily understand the construction and function of reversible and nonreversible actuators.

Moreover, the actuators 42 can be configured to activate upon a determination that a set of predetermined conditions has been met. A sensing system 46 (including one or more sensors), as shown in FIG. 1B, may be used to determine such conditions. The actuators 42 activate upon the sensing system 46 sensing an impact with the vehicle body or determining that the possibility of impact with the vehicle body is greater than a predetermined amount (e.g., such as upon sensing an object in the vicinity of the vehicle body 16, 18 or upon rapid deceleration). In the latter arrangement, the sensor system 46 monitors environment around the vehicle body (16, 18) and transmits data describing the vehicle's environmental conditions to a control unit 48. The control unit 48 may be any one of a variety of controllers typically found on modern vehicles, such as an engine controller or a transmission controller, or may be a separate controller dedicated to the hood assembly 10. The control unit 48 is programmed to analyze the sensor data and determine if one or more conditions indicative of an elevated risk of vehicle impact under the predetermined conditions exists. After the actuator 42 activates, the control unit 48 may also be programmed to retract or reverse the actuator 42, and thereby lower the hood 12, if a vehicle impact does not in fact occur after a predetermined amount of time.

The actuator 42 is preferably mounted to the vehicle body structure at 18 at an angle θ measured from a substantially vertical axis V, which is substantially normal to the rearward portion 26 of the vehicle hood 12 at an area adjacent the actuator when in the closed (or first) position 34. In a preferred embodiment, θ is approximately equal to −20°. The actuator 42 can be positioned to exert a frontward or rearward force on the second link 22 of the support members. FIGS. 1a and 1b show the actuator 42 positioned to exert a frontward force on the second link 22 of the support members causing the hood 12 to move frontward with respect to the front compartment 14. In another embodiment shown in FIG. 2, the actuator 42 is positioned to exert a rearward force on the second link 22 of the support members causing the hood 12 to move rearward with respect to the front compartment 14. In this embodiment, the angle of the actuator 42 to the vehicle body structure at 18, denoted by θ', is 20°.

A striker 50 is mounted to the hood 12 and configured to enable the hood 12 to travel in a direction that is commensurate with the direction in which the actuator rod 28 extends. A latch member 54 is mounted to the vehicle body at 16 and is engageable and disengageable with the striker 50 as will be readily understood by those skilled in the art. The latch member 54 is shown only schematically and in fragmentary, cross-sectional view in FIGS. 1a through 3c. Any typical latch member configured to be engageable and disengagable about a striker may be utilized. One such latch member is described in commonly assigned U.S. Pat. No. 5,048,877 entitled Pop-Up Hood Latch, Rogers, Jr. et al., issued Sep. 17, 1991, and hereby incorporated by reference in its entirety. One of the technical advantages of the striker 50 is that it enables the frontward portion 40 of the hood 12 to elevate. Typically, a conventional striker 52 is not contoured, as shown in FIG. 3c, thus the frontward portion 40 of the hood 12 is substantially prevented from elevating in conjunction with an elevation of the rearward portion 26 of the hood 12. This is a result of both ends of the non-contoured striker 52 being at relatively the same vertical height with respect to the latch member 54, which is mounted to the vehicle body structure at 16 and encircles the non-contoured striker 52. In this instance, the frontward portion 40 of the hood 12 merely pivots about the connection of the non-contoured striker 52 at the latch member 54. However, in the preferred embodiments shown in FIGS. 3a and 3b, the striker 50 or 50' is configured with a contoured shape that defines a predetermined course, 56 or 56' respectively, along which the striker 50 or 50' can travel. As the actuator 42 or 42' extends, exerting a force to move the rearward portion 26 of the hood 12, the latch member 54 confines the striker 50 or 50', guiding it along the predetermined course 56 or 56' as the hood 12 moves from the first position 34 to the second position 36. Though the preferred embodiment only utilizes one striker 50 and latch member 54, other arrangements include two or more striker/latch member pairs.

Unlike the noncontoured striker 52, having a horizontal base 58 as shown in FIG. 3c, the contoured striker 50 and 50' of FIGS. 1–3b provides a contoured base having a first segment 60 and a second segment 62 at an elevation, which differs from the first segment 60 by an amount H. Thus, when the desired path for hood travel is frontward, as shown in FIG. 3a, the actuators 42 are activated and the striker 50 moves with respect to the latch 54 such that the striker 50 is positioned with the latch 54 in the second segment 62 when the hood is in the first position 34. The latch 54 is then positioned in the first segment 60 when the hood is in the second position 36 (see FIG. 1B). This allows the front portion 40 of the hood 12 to be raised with respect to the vehicle body structure at 16 by the amount dictated by the vertical difference between the first and second segments of the contoured surface (60, 62) of the striker 50 as depicted in FIGS. 3a and 3b.

Likewise when the desirable path for hood travel is rearward with respect to the front compartment, the actuator 42' and actuator rod 28' (as shown in FIG. 2) exerts a rearward force on the second link 22. FIG. 3b shows a striker 50' designed to support rearward travel of the hood 12. In the first position 34 the latch member 54 is situated in the second segment 62' of the striker 50'. The hood 12 travels rearward and the striker 50'—being attached to the hood 12—follows, traveling rearward with respect to the vehicle body structure at 16. As the hood 12 is raised and pushed rearward, the striker 50' moves with respect to the engaged latch 54 from the second segment 62' to the first segment 60', allowing the striker 50' (and, therefore, the frontward portion of the hood 12) to rest at a higher point when the hood 12 reaches a second position—similar to position 36 of FIG. 1b but more rearward. For the rearward-moving hood embodiment (in FIG. 2), the lower portion of the striker 50' is closer to the frontward portion 40 of the hood 12 whereas in the forward-moving hood embodiment (in FIG. 1a) the lower portion of the striker 50 is closer to the rearward portion of the hood 12.

Moreover, the invention is not limited to having the striker 50 mounted to the hood 12. The striker 50 may be mounted to the vehicle body at 16 and the latch member 54 mounted to the vehicle hood 12. As the hood 12 is raised the same relative movement occurs between the striker 50 and the latch member 54, permitting the frontward portion 40 of the hood to be raised an amount H.

The latch member 54 is designed to be selectively disengagable from the striker 50'. FIG. 2, illustrates the third position 38, which can be ideal for service to the vehicle's engine compartment 14. The vehicle hood 12 can be slightly raised by a lever or other mechanism operatively located in the passenger compartment of the vehicle (not shown) connected to the latch member 54 and operable to disengage the latch member 54. Once the hood 12 is slightly raised, a secondary latch (not shown), also engageable with the striker 50, is accessible allowing an operator to disengage the secondary latch from the striker 50 and manually raise the frontward portion 40 of the hood 12. The support member (20, 22, 24) allows the hood 12 to pivot generally about its rearward portion 26 to the third position 38. FIG. 2, shows the striker 50 disengaged from the latch member 54. Notably, disengagement of the latch member 54 is accomplished without actuating the actuator 42. Therefore, the invention enables access to the front compartment 14 of the vehicle without extending the actuator 42. Accordingly, because the actuator 42 is not needed for raising the hood 12 to the third position 38 during servicing, it will not routinely move between extended and retracted states. Thus, a one-way, nonreversible actuator 42 may be utilized for raising the hood 12 to the second position 36 (i.e., during an impact/potential impact).

A method of elevating a vehicle hood with respect to a vehicle body includes providing a striker connected to the hood or the vehicle body. The striker is configured to automatically guide the frontward portion of the vehicle hood with respect to the predetermined course to thereby elevate the frontward portion. The method includes providing a latch member connected to the other of the hood or the vehicle body and engaged with the striker to latch the hood to the vehicle body. The method includes providing an actuator extendable for elevating the rearward portion of the vehicle hood upon either impact or a determination that the possibility of impact is greater than a predetermined amount. The method also includes the step of disengaging the latch member from the striker without extending the actuator (i.e., the actuator may remain in a retracted position and need not be extended to disengage the latch member). The strikers 50, 50' and actuators 42, 42' discussed above with respect to FIGS. 1a–3b allow disengagement without operation of the actuator. Manually raising the frontward portion of the hood then permits access to the front compartment without operating the actuator. If the frontward portion is lowered, and the latch member reengaged with the striker, the rearward portion may be elevated via the actuator in response to either an impact with the hood or a determination that the possibility of an impact is greater than a predetermined amount. Due to the configuration of the striker provided, the method then includes automatically guiding the frontward portion with respect to the predetermined course in response to elevating the rearward portion. Because of this guidance, the frontward portion is elevated.

While the best modes for carrying out the invention have been described in detail, those familiar with the art to which this invention relates will recognize various alternative designs and embodiments for practicing the invention within the scope of the appended claims.

The invention claimed is:

1. A hood latch assembly for a vehicle comprising:
    a striker extendable between a vehicle hood and a vehicle body at a generally forward portion of said hood;
    a latch member selectively engageable with said striker to latch said hood to said vehicle body;
    an actuator selectively extendable to raise a generally rearward portion of said hood;
    wherein said striker has a contoured contact surface with a nonlinear slope so that a distance between said latch member and said generally forward portion of said hood substantially increases when said actuator is extended to permit said hood to rise relative to said body at said latch member such that all of said hood rises as said actuator raises the generally rearward portion of said hood, said latch member remaining engaged with said striker as said hood rises; and
    wherein, when in use with said hood, said hood is pivotable such that the generally forward portion rises further relative to said vehicle body when said actuator is not extended and said latch member is disengaged from said striker.

2. The hood latch assembly of claim 1, wherein said actuator is extended upon an impact with one of the hood and the vehicle body.

3. The hood latch assembly of claim 1, wherein said actuator is extended upon a determination that a predetermined condition has occurred.

4. A vehicle hood assembly, comprising:
    a hood configured to extend above and over a vehicle compartment defined at least partially by a vehicle body, said hood being moveable with respect to the compartment from a first position to a second position;
    a support member operatively connected between said hood and said vehicle body and moveable to move said hood from the first position to the second position;
    an actuator extendable to move said support member; thereby moving said hood from the first position to the second position;
    a striker extending between said hood and said vehicle body;
    a latch member extending between said hood and said vehicle body and selectively engageable and disengageable with said striker to latch and unlatch said hood from said vehicle body respectively; wherein said striker has a contoured contact surface with a nonlinear slope so that a distance between said latch member and said generally forward portion of said hood substantially increases when said actuator is extended; wherein each point on said hood is further above said vehicle body in the second position than in the first position; wherein said latch member remains engaged when said hood moves from the first position to the second position; and
    wherein said latch member is disengageable from said striker without extending said actuator to thereby permit movement of said hood from the first position to a third position for access to the vehicle compartment.

5. The vehicle hood assembly of claim 4, wherein said hood is not moveable from the second position to the first position via movement of said support member by said actuator.

6. The vehicle hood assembly of claim 4, wherein said actuator is extended upon an impact with one of said hood and the vehicle body.

7. The vehicle hood assembly of claim 4, wherein said actuator is extended upon a determination that a predetermined condition has occurred.

8. The vehicle hood assembly of claim 4, wherein said actuator exerts a forward force on said hood when said hood moves from the first position to the second position, thereby causing said hood to be at least partially more forward with respect to the vehicle compartment in the second position than in the first position.

9. The vehicle hood assembly of claim 4, wherein said actuator exerts a rearward force on said hood when said hood moves from the first position to the second position, thereby causing said hood to be at least partially more rearward with respect to the vehicle compartment in the second position than in the first position.

10. The vehicle hood assembly of claim 4, wherein said actuator exerts a force on said hood in a direction that causes said latch member to move along said contoured contact surface defined by said striker when said hood moves from the first position to the second position.

11. The vehicle hood assembly of claim 4, wherein said actuator is mounted at an angle of 0 degrees to 20 degrees from a direction substantially normal to the rearward portion of said hood.

12. The vehicle hood assembly of claim 4, wherein said striker is cooperatively configured with said support member such that the second position is frontward of the first position.

13. A vehicle hood assembly comprising:
    a hood configured to extend above and over a vehicle compartment defined at least partially by a vehicle body, said hood being moveable with respect to the compartment from a first position to a second position;
    a support member operatively connectable between said hood and the vehicle body and moveable to move said hood from the first position to the second position;
    an actuator extendable to move said support member;
    a striker extending between said hood and said vehicle body
    a latch member extending between said hood and said vehicle body and selectively engageable with and disengageable from said striker to latch and unlatch said hood from said vehicle body respectively; wherein said striker has a contoured contact surface with a nonlinear slope so that a distance between said latch member and said generally forward portion of said hood substantially increases when said actuator is extended; wherein each point on said hood is further above said vehicle body in the second position than in the first position; wherein said latch member remains engaged when said hood moves from the first position to the second position;

wherein said latch member is disengageable from said striker without operating said actuator to thereby permit movement of said hood from the first position to a third position for access to the vehicle compartment; and wherein said actuator exerts a forward force on said hood when said hood moves from the first position to the second position, thereby causing said hood to be at least partially more forward with respect to the vehicle compartment in the second position than in the first position.

14. A method of elevating a vehicle hood with respect to a vehicle body comprising:

providing a striker having a contoured contact surface with a nonlinear slope configured to automatically guide a frontward portion of the hood with respect to the nonlinear slope to thereby elevate an entire frontward end of the hood;

providing a latch member engaged with the striker to latch the hood to the vehicle body;

providing an actuator extendable for elevating a rearward portion of the hood upon one of an impact with the vehicle body, an impact with the hood and a determination that a predetermined condition has occurred;

disengaging said latch member from the striker without extending the actuator; and raising the frontward portion of the hood to permit access to a front compartment at least partially defined by the vehicle body, said raising occurring without extending the actuator.

15. The method of claim 14, further comprising:

lowering the frontward portion of the hood;

reengaging the latch member with the striker;

elevating the rearward portion of the hood by extending the actuator in response to an impact with the hood or a determination that a predetermined condition has occurred;

automatically guiding the frontward end of the hood along the contoured contact surface in response to said elevating of the rearward portion to thereby elevate the frontward end of the hood.

16. The method of claim 15, wherein the actuator is retractable for lowering the rearward end of the hood, and further comprising:

after said elevating, lowering the rearward end of the hood by retracting the actuator in response to the possibility of impact being below the predetermined amount for a predetermined duration of time.

* * * * *